United States Patent [19]

Gamberini

[11] Patent Number: 4,602,428

[45] Date of Patent: Jul. 29, 1986

[54] INPUT DEVICE ON A PLANT FOR METERING PHARMACEUTICAL PRODUCTS INTO CAPSULES

[75] Inventor: Ernesto Gamberini, Pianoro, Italy

[73] Assignee: MG 2 S.p.A., Bologna, Italy

[21] Appl. No.: 656,178

[22] Filed: Sep. 28, 1984

[30] Foreign Application Priority Data

Sep. 30, 1983 [IT] Italy ................................ 3571 A/83
Oct. 10, 1983 [IT] Italy ................................ 5015/83[U]

[51] Int. Cl.[4] ................................ B23Q 7/10
[52] U.S. Cl. ................................ 29/809; 29/426.3; 29/792; 29/822; 29/DIG. 73; 29/DIG. 78
[58] Field of Search .................... 29/426.1, 426.3, 792, 29/822, DIG. 73, DIG. 78, 809

[56] References Cited

U.S. PATENT DOCUMENTS 3,581,377 6/1971 McKnight .......................... 29/426.3

FOREIGN PATENT DOCUMENTS 891314 12/1981 U.S.S.R. ................................ 29/821

*Primary Examiner*—Mark Rosenbaum
*Assistant Examiner*—Ronald S. Wallace
*Attorney, Agent, or Firm*—Michael N. Meller

[57] ABSTRACT

A device wherein pharmaceutical capsules, each consisting of a separable bottom for receiving the said pharmaceutical product and a separable top for closing the said bottom, are fed in bulk into an input feedbox and sent, through a number of withdrawal and positioning ducts, to a rotary conveying device having two parts, one over the other, the first having a number of upper recesses for the tops and the second having a number of lower recesses for the respective bottoms, the rotary conveying device cooperating with a suction opening device designed to hold the tops inside the upper recesses and to suck the bottoms into the lower recesses, so as to separate the latter from the respective tops.

4 Claims, 2 Drawing Figures

INPUT DEVICE ON A PLANT FOR METERING PHARMACEUTICAL PRODUCTS INTO CAPSULES

BACKGROUND OF THE INVENTION

The present invention relates to an input device on a plant for metering pharmaceutical products into capsules, each consisting of a bottom for receiving the said product and a top for closing the said bottom.

On known metering plants, closed capsules are usually fed from an input unit to a first conveyor by which they are fed to a first metering station. At the latter, the capsules are usually opened by removing the top which is held by a second conveyor running parallel with the first. One drawback on the aforementioned known types of plants, on which the tops and bottoms are separated at the first metering station, lies in having to feed whole capsules at least partway through the plant, the only useful part of the said capsules, at least metering-wise, consisting of the bottoms.

SUMMARY OF THE INVENTION

The aim of the present invention is to provide an input device for the said capsules designed to separate the tops and bottoms immediately, thus enabling the tops to be sent along a different route from the bottoms, the said route possibly extending outside all the metering stations on the aforementioned metering plant.

With this aim in view, the present invention relates to an input device on a plant for metering pharmaceutical products into capsules, each comprising a bottom for receiving the said product and a top for closing the said bottom, characterised by the fact that it comprises, in due combination, an input feedbox for the said capsules, a number of withdrawal ducts arranged round the said feedbox and moving back and forth in relation to the same, a rotary conveying device located below the said withdrawal ducts and comprising a first and second conveying element arranged one over the other and provided respectively with a number of first recesses for the said tops and a number of second recesses for the respective said bottoms, and an opening device cooperating with the said rotary device in such a manner as to move each top and the respective bottom axially in relation to each other and to secure them to the respective said first and second recesses, each said withdrawal duct feeding, during operation, a succession of the said capsules to the said rotary conveying device. The second conveying element comprises a first annular element, turning around its own axis and a belt conveyor wound partially around the second conveying element. The second recesses are carried on the belt conveyor.

BRIEF DESCRIPTION OF THE DRAWINGS

A number of non-limiting examples of the present invention will now be described with reference to the attached drawings in which.

DETAILED DESCRIPTION OF THE INVENTION

Figure 1:
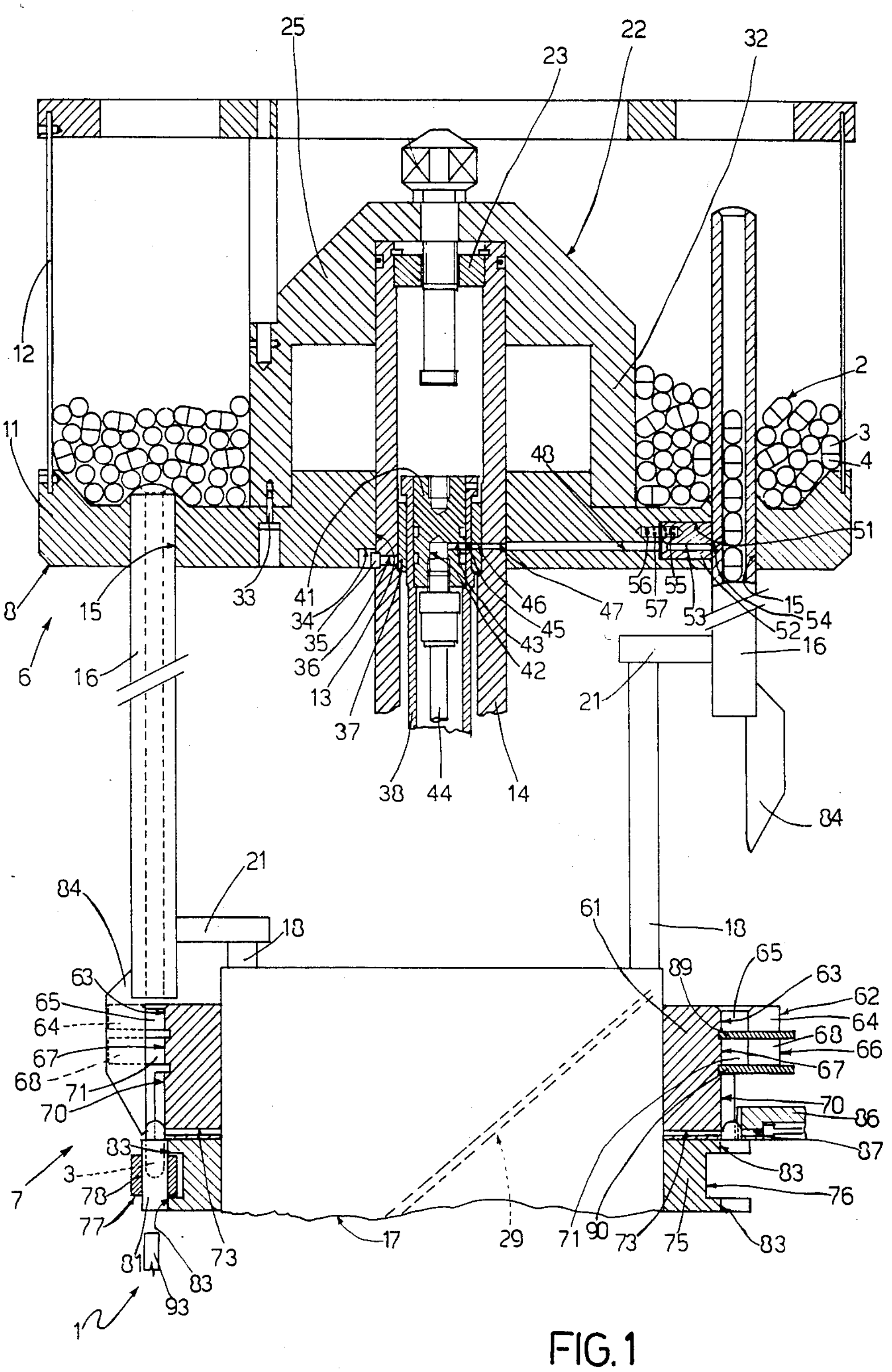
FIG. 1 shows an axial section of an input device on a plant for metering pharmaceutical products according to the present invention.

Number 1 in FIG. 1 indicates an input device on a plant 10 for metering pharmaceutical products into capsules 2 each consisting of a separable bottom 3 and a separable top 4.

Device 1 presents a top part 6 and a bottom part 7. Top part 6 comprises a rotary feedbox 8 containing a number of capsules 2 and defined by an annular base wall 11 and a cylindrical side wall 12. Base wall 11 presents a vertical center hole 13 engaged by a hollow rotary drive shaft 14 designed to turn feedbox 8. Around a peripheral rim of wall 11, provision is made for a number of through holes 15 parallel with the axis of hole 13 and each engaged in axially sliding manner by a respective tubular withdrawal duct 16. Each duct 16 turns with feedbox 8 around the axis of the latter and is moved back and forth in relation to the same by a vertical cam 29 formed inside a rotary cylindrical element 17 on bottom part 7 and cooperating with a number of vertical tappet rods 18 mounted in axially sliding manner on element 17 and each made integral with a respective duct 16 by means of a side bracket 21.

Shaft 14 has its bottom end (not shown) fitted on element 17 and its top end located inside and connected to feedbox 8 by a cup-shaped cylindrical body 22 having its concave side facing downwards. The top end of shaft 14 is made axially integral with body 22 by coupling 23, the latter being axially integral with and mounted inside shaft 14 and being engaged by a threaded pin 37 fitted through a top wall 25 on body 22. Body 22 also presents a cylindrical side wall 32 extending downwards from wall 25 and made integral with wall 11 on feedbox 8 by a number of screws 33.

At the bottom end of hole 13 in wall 11, provision is made for a recess 34 through which a screw 35 may be screwed into a threaded radial hole 36 on shaft 14. At hole 13, shaft 14 houses, by means of bush 37, the top end of a tubular element 38 extending downwards inside shaft 14. The said element 38 is supported by a fixed portion (not shown) of device 1 so as not to turn with shaft 14. The top end of element 38 is closed off by a cap 41 having a dead axial hole at the bottom communicating with radial hole 43. Hole 42 presents a threaded bottom section engaged by one end of duct 44 constituting the end of a compressed air supply circuit.

Hole 43 is coaxial with a radial through hole 45 on tubular element 38 and with a radial through hole 46 on bush 37. At hole 43, shaft 14 presents a number of radial through holes 47 equal in number to ducts 16. As shaft 14 turns round, holes 47 communicate, one after the other, with hole 43 by means of holes 45 and 46.

On base wall 11, provision is made for a number of radial holes 48 coaxial with holes 47 and equal in number to ducts 16. Between holes 15 and holes 48, provision is made on base wall 11 for respective cavities 51 each engaged by a respective plastic sealing bush 52 along which provision is made for a through hole 53 coaxial with hole 48. Each hole 53 communicates with the inside of the respective duct 16, when the latter is in the topmost axial slide position, by means of a through hole 54 in a corresponding wall on duct 16. Bush 52 also presents a dead hole 55 coaxial with and facing a dead hole 56 formed in base wall 11 in cavity 51 and parallel with hole 48. Holes 55 and 56 house opposite ends of a spring 57 designed to press bush 52 against respective duct 16. Element 17 is fitted with a rotary conveying device comprising an annular element or coupling 61 at the top. From the top end of coupling 61 extends a first flange 62 having a number of radial slots 63 equal in number to ducts 16. In more detail, each slot 63 presents a radial end section 64, of constant width at least equal to the outside diameter of bottoms 3, and an inner section 65 being circular in shape when viewed from above, slightly larger in diameter than the width of section 64 and smaller in diameter than the outside diameter of tops 4. Underneath and parallel with flange 62, a second flange 66 extends from coupling 61, the said flange 66 also presenting a number of radial slots 67 equal in number and located next to slots 63. Slots 67 also present a radial end section 68 of constant width and a circular inner section 71 coaxial with sections 65 of slot 63.

Below flange 66, in the cylindrical outer surface of coupling 61, provision is made for a number of axial grooves 70 defining a conveyor drum element for tops 4. Grooves 70 define as many semicircular recesses, coaxial with slots 63 and 67 and each communicating with a respective radial hole 73 formed through coupling 61 and constituting the end section of an air intake circuit. Below coupling 61, element 17 is fitted with a second annular element or coupling 75 constituting part of a further conveying element comprising a belt conveyor 77 wound partially around coupling 75. Along its cylindrical outer surface, coupling 75 presents an annular cavity 76 engaged by a portion of conveyor 77 and limited at the top and bottom by two flanges 82 each having a respective number of radial slots 83 essentially semi-circular in shape when viewed from above. Belt conveyor 77 consists of a number of hollow cylinders 81 connected together by a ring belt 78 and designed to engage slots 83 one after the other.

From the bottom end of each duct 16 extends downwards a respective appendix 84 designed to engage alternately a respective pair of end sections 64 and 68. The spaces between flanges 62 and 66 and respectively between flange 66 and grooves 70 are partially engaged by respective fixed blades 89 and 90 extending as far as respective peripheral portions of coupling 61. In known manner, dispensed with herein for simplicity, blades 89 and 90 cooperat with slots 63 and 67 and appendixes 84 in such a manner as to guide capsules 2, as they drop down towards respective cylinders 81, and to position them, as they fall, so that bottom 3 faces downwards. Below conveyor 77, at a given point on the periphery of coupling 75, provision is made for a duct 93 communicating selectively with the bottom end of cylinders 81 and constituting the bottom of an air intake circuit. Duct 93 and holes 73 combine to form a device for opening capsules 2.

Belt conveyor 77 defines a route along which bottoms 3 are fed through metering plant 10. Tops 4, on the other hand, once separated from bottoms 3 by opening device 93–73, are held, by the vacuum created through holes 73, inside grooves 70 and fed along a separate route from that of belt conveyor 77, the said route comprising a conveyor drum 86 tangent with coupling 61 at grooves 70 and provided with its own axial grooves, in turn, provided with respective suction holes 87 for holding tops 4.

During operation, ducts 16, once they reach the bottom dead center position at which the top end is essentially on a level with the top surface of the base wall 11 on feedbox 8, move back up so as to fill up with capsules 2. The latter are arranged in single file inside each duct 16, some with top 4 facing up and others with top 4 facing down.

When, as a result of the thrust exerted by cam 29 on rods 18, each duct 16 reaches its bottom dead center position, a known device (not shown) for stopping capsules 2 inside duct 16 causes a single capsule 2 to drop out of the bottom end of duct 16 and through slots 63 and 67 facing it.

As it falls, each capsule 2 is conveyed by coupling 61 and cooperates, in known manner over given arcs, with fixed blades 89 and 90, in such a manner that, by the time it reaches respective groove 70, it is positioned parallel with the latter with its top 4 facing up. As it moves down respective groove 70, each capsule 2 is accompanied by appendix 84 of respective duct 16, the function of which is not only to hold the said capsule 2 inside groove 70 and guide it as it moves along, but also to stop capsule 2 when top 4 on the same comes to face respective holes 73 and bottom 3 on the same partially engages respective cylinder 81.

At this stage, the suction created through duct 93 causes each bottom 3 to be removed from its respective top 4, and the said bottom 3 to drop inside respective cylinder 81, whereas the respective top 4 remains attached to coupling 61 as a reslt of the vacuum created through respective hole 73.

Figure 2:
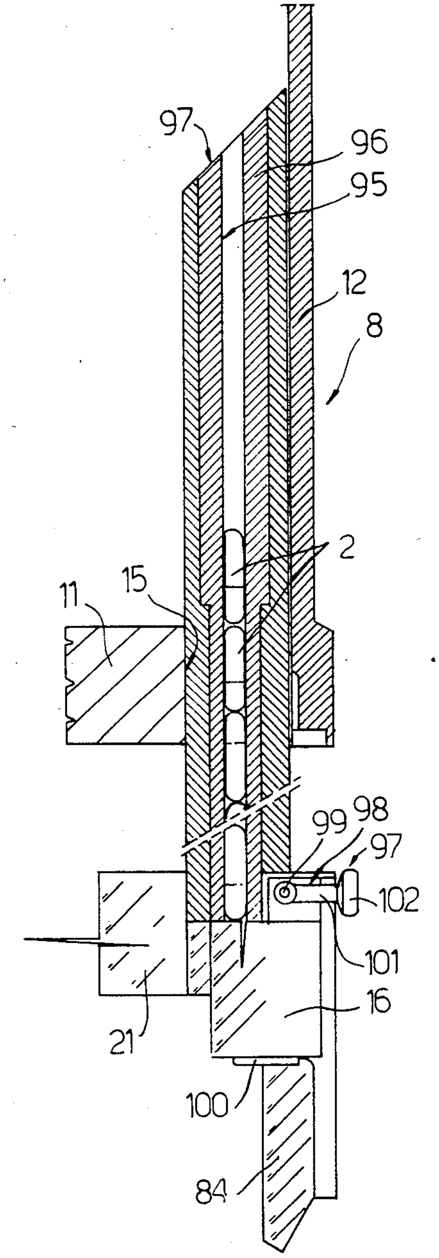
FIG. 2 shows an axial section of a variation of a detail in FIG. 1.

FIG. 2 shows a variation in the shape and position of ducts 16 on feedbox 8.

As shown in FIG. 2, holes 15 are formed right next to the inner surface of wall 12 to prevent capsules 2 from collecting in the space between ducts 16 and wall 12 and from being crushed against the latter.

Furthermore, unlike the arrangement shown in FIG. 1, the inside diameter of duct 16 in FIG. 2 is decidedly larger than the outside diameter of capsules 2. The latter, in fact, engage, not duct 16, but an axial hole 95 in a liner 96 fitted inside duct 16 and replaceable according to the diameter of capsules 2 involved.

Finally, the top end of the unit consisting of each duct 16 and its respective liner 96 is defined by a surface 97 sloping downwards towards the centre of feedbox 8, so as to facilitate entry of capsules 2 inside liner 96. As for duct 44, this constitutes the input of a known clearing device designed to supply compressed air selectively inside each duct 16 through holes 42, 43, 45, 46, 47, 48 and 53, so as to clear the said duct 16 of any crushed or otherwise damaged capsules 2.

The FIG. 2 variation shows a device 97 for stopping capsules 2 inside hole 96. Device 97 comprises a rocker arm 98 hinged at 99 on to duct 16 and comprising a first arm 100, designed to close the bottom end of hole 96, and a second arm 101, extending outwards crosswise and provided with a cam-follower roller 102 designed to cooperate with a fixed cam, not shown, for opening and closing respective hole 96.

I claim:

1. Input device on a plant for metering pharmaceutical products into capsules, each capsule having a bottom for receiving the said product and a top for closing the said bottom, said input device comprising an input feedbox for the said capsules, a number of withdrawal ducts arranged around the said feedbox and moving back and forth in relation to the same, a rotary conveying device located below the said withdrawal ducts and comprising a first and second conveying element arranged one over the other and provided respectively with a number of first recesses for the said tops and a number of second recesses for the respective said bottoms, and an opening device cooperating with the said rotary device in such a manner as to move each top and the respective bottom axially in relation to each other and to secure them to the respective said first and second recesses, each said withdrawal duct feeding, during operation, a succession of the said capsules to the said rotary conveying device and wherein said second conveying element comprises a first annular element, turning around its own axis, and a belt conveyor wound partially around the said second conveying element, the said second recesses being carried by the said belt conveyor.

2. Device according to claim 1, wherein said second conveying element comprises a first annular element turning round its own axis, the said first recesses being formed round the periphery of the said second annular element itself.

3. Device according to claim 1, wherein said opening device is a suction device.

4. Device according to claim 3, wherein said suction device comprises a number of first suction ducts, extending radially through the said second annular element and each communicating with a respective said first recess, and a second suction duct located below the said first annular element and communicating in succession with the bottom end of each said second recess.

* * * * *